US008260666B2

(12) United States Patent
Kalaboukis et al.

(10) Patent No.: US 8,260,666 B2
(45) Date of Patent: Sep. 4, 2012

(54) DYNAMIC DEMAND CALCULATION USING CAPTURED DATA OF REAL LIFE OBJECTS

(75) Inventors: Chris Kalaboukis, San Jose, CA (US); Irfan Presswala, Sunnyvale, CA (US); Chris W. Higgins, Portland, OR (US); Christopher T Paretti, Sunnyvale, CA (US); Marc Davis, San Francisco, CA (US); Edward Stanley Ott, IV, Sunnyvale, CA (US); Athellina Athsani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 844 days.

(21) Appl. No.: 12/353,797

(22) Filed: Jan. 14, 2009

(65) Prior Publication Data

US 2010/0179857 A1    Jul. 15, 2010

(51) Int. Cl.
*G06Q 30/00*    (2012.01)
*G07F 19/00*    (2006.01)

(52) U.S. Cl. ........................ 705/14.53; 705/34
(58) Field of Classification Search ...................... 705/10
See application file for complete search history.

(56) References Cited

U.S. PATENT DOCUMENTS

| | | | | |
|---|---|---|---|---|
| 5,544,321 A * | 8/1996 | Theimer et al. | ............... | 709/226 |
| 6,609,106 B1 * | 8/2003 | Robertson | ........................ | 705/5 |
| 6,611,811 B1 * | 8/2003 | Deaton et al. | ............. | 705/14.39 |
| 7,010,501 B1 * | 3/2006 | Roslak et al. | ................... | 705/23 |
| 7,270,262 B2 * | 9/2007 | Hartenstine | ................... | 235/375 |
| 7,627,502 B2 * | 12/2009 | Cheng et al. | ................. | 705/27.2 |
| 7,792,703 B1 * | 9/2010 | Amidon et al. | .............. | 705/26.1 |
| 7,797,204 B2 * | 9/2010 | Balent | .............................. | 705/28 |
| 7,827,055 B1 * | 11/2010 | Snodgrass et al. | ......... | 705/14.26 |
| 7,991,652 B2 * | 8/2011 | Chamberlain | .................. | 705/28 |
| 8,122,020 B1 * | 2/2012 | Donsbach et al. | ............ | 707/732 |
| 2001/0021921 A1 * | 9/2001 | Kan et al. | ........................ | 705/27 |
| 2001/0049636 A1 * | 12/2001 | Hudda et al. | .................... | 705/26 |
| 2002/0032791 A1 * | 3/2002 | Isherwood et al. | ........... | 709/230 |
| 2002/0161671 A1 * | 10/2002 | Matsui et al. | .................... | 705/27 |
| 2002/0167161 A1 * | 11/2002 | Butland | .......................... | 283/72 |
| 2003/0083961 A1 * | 5/2003 | Bezos et al. | ..................... | 705/27 |
| 2003/0204449 A1 * | 10/2003 | Kotas et al. | ..................... | 705/27 |
| 2004/0122746 A1 * | 6/2004 | Charlier et al. | ................. | 705/27 |
| 2004/0147270 A1 * | 7/2004 | Petrovich | ................... | 455/456.3 |
| 2005/0055451 A1 * | 3/2005 | Tsuyama et al. | .............. | 709/229 |
| 2005/0246238 A1 * | 11/2005 | Dvorak | ........................... | 705/26 |
| 2005/0256781 A1 * | 11/2005 | Sands et al. | ..................... | 705/26 |
| 2006/0007003 A1 * | 1/2006 | Yamagiwa | .................. | 340/572.1 |
| 2006/0011716 A1 * | 1/2006 | Perkowski | ..................... | 235/375 |

(Continued)

*Primary Examiner* — Elaine Gort
*Assistant Examiner* — Ashford S Hayles
(74) *Attorney, Agent, or Firm* — Martine Penilla Group, LLP

(57) ABSTRACT

Methods and system for managing demand for an object includes capturing information about the object through a mobile device associated with a user. The mobile device is configured to capture information about the object that include one or more of a spatial, temporal, topical and social attributes of the object. The identity of the object is verified and validated using this metadata captured by the user through the device from the real world object or its proxy. Upon successful verification and validation, the object and its metadata are automatically added to a wish list of the user. An aggregate list is generated using the attributes and metadata of the object from a plurality of users. The aggregate list defines a source of demand for the object. The object is tracked as it progresses through various phases of ownership cycle using dynamic demand calculations based on the information associated with the objects, the users and the aggregate lists.

26 Claims, 8 Drawing Sheets

U.S. PATENT DOCUMENTS

| | | | |
|---|---|---|---|
| 2006/0089897 A1* | 4/2006 | Maas et al. | 705/37 |
| 2006/0136300 A1* | 6/2006 | Kopelman et al. | 705/14 |
| 2006/0212357 A1* | 9/2006 | White et al. | 705/18 |
| 2006/0282304 A1* | 12/2006 | Bedard et al. | 705/10 |
| 2007/0095903 A1* | 5/2007 | Suenbuel | 235/383 |
| 2007/0152033 A1* | 7/2007 | Hind et al. | 235/376 |
| 2007/0250403 A1* | 10/2007 | Altschuler | 705/26 |
| 2008/0027814 A1* | 1/2008 | Kulakowski et al. | 705/14 |
| 2008/0040240 A1* | 2/2008 | Covington et al. | 705/27 |
| 2008/0065514 A1* | 3/2008 | Eaton | 705/27 |
| 2008/0114663 A1* | 5/2008 | Watkins et al. | 705/26 |
| 2008/0115168 A1* | 5/2008 | Adwankar et al. | 725/46 |
| 2008/0147625 A1* | 6/2008 | Altounian et al. | 707/4 |
| 2008/0235108 A1* | 9/2008 | Kulakowski et al. | 705/26 |
| 2008/0243915 A1* | 10/2008 | Shah et al. | 707/103 Y |
| 2008/0306801 A1* | 12/2008 | Musier et al. | 705/8 |
| 2009/0048941 A1* | 2/2009 | Strassmann | 705/27 |
| 2009/0070273 A1* | 3/2009 | Moryto | 705/80 |
| 2009/0094260 A1* | 4/2009 | Cheng et al. | 707/100 |
| 2009/0138380 A1* | 5/2009 | Roseman et al. | 705/27 |
| 2009/0242232 A1* | 10/2009 | Holcombe et al. | 174/68.1 |
| 2009/0271275 A1* | 10/2009 | Regmi et al. | 705/14.73 |
| 2009/0271284 A1* | 10/2009 | Arbib | 705/26 |
| 2009/0281877 A1* | 11/2009 | Bezos et al. | 705/10 |
| 2010/0095357 A1* | 4/2010 | Willis et al. | 726/6 |
| 2010/0138304 A1* | 6/2010 | Boyarsky et al. | 705/14.65 |
| 2011/0010270 A1* | 1/2011 | Hamilton et al. | 705/26.63 |
| 2011/0202423 A1* | 8/2011 | Pratt et al. | 705/26.7 |

* cited by examiner

DYNAMIC DEMAND CALCULATION USING CAPTURED DATA OF REAL LIFE OBJECTS

BACKGROUND

1. Field of the Invention

The present invention relates to interfacing with real world objects, and more particularly, to managing demand for an object in the physical world by way of dynamic demand analysis.

2. Description of the Related Art

The computing industry has seen many advances in recent years, and such advances have produced a multitude of products and services. One such service is the internet commerce. As the internet becomes ever more popular, internet commerce is gaining ground as a more preferred way of conducting business. With the expanse of information available on the internet, a user surfing the internet is able to identify a product he/she is interested in and obtain information associated with the product by navigating through various websites.

However, when a user is in the physical world and takes a liking for a product in a store window or on display that he/she may be interested in buying, currently there is no effective way of linking the user's interest to a wish list that the user can update and maintain. The user can maintain a manual wish list with detailed information of the product or the user may be able to capture an image of the product or information about the project by manually entering the information in an electronic device, such as Personal Digital Assistant (PDA), and then surfing the Internet to query about the product, obtain information and perform analysis of the information so that the user may be able to make informed decisions. This approach relies on the user's continued interest to follow up on doing the research on the Internet to obtain the information about the product.

Further, the user's interest in the product may result in the purchase of the product at which time the user has to surf websites or advertisements of various dealers to determine the price, discounts, etc and compare the prices/discounts to determine an optimal price and deal and identify the dealer to purchase from in order to obtain optimal benefit.

At the dealer, the user has to go with the process of checking out the object, wherein the user selects the object and places it in a shopping cart, and proceeds to the checkout counter. At the checkout counter, the user provides the checker or checkout clerk coupon clips for applying discounts to the product. The checker scans the object, scans the discount coupons and registers the payment. Upon purchase of the product, the user has to manually update the wish list (if any) by removing the product from the wish list. This process is labor intensive and prone to careless or inadvertent omissions.

Further, upon purchase of the product, tracking of the product falls off the tracking radar. There is no clear and concise way of tracking the product associated with a user through various stages of use. Tracking the product through various stages of use and providing feedback to a retailer or manufacturer would provide valuable insight that can be used for tailoring the product and/or refining the marketing strategy of the product for a greater return on investment. When the user decides to sell the product, the user needs to register the product for sale and determine the dealers that can sell his product, determine the demand for his/her product, define a value based on the demand and then register the product at each of the selected dealers to market his/her product. Once again, this is a manual and labor intensive process that takes up too much time and energy.

It would be beneficial if the product can be automatically tracked through the various ownership cycle so that the demand for the product may be determined and selling of the product may be coordinated to avail optimal return on investment.

It is in this context that the embodiments of the invention arise.

SUMMARY

Embodiments of the present invention provide methods and system for managing a demand of an object in the physical world. Information of an object is captured by a user using a mobile device associated with the user. The captured information could be an image, bar code, RFID tag information, textual information or of any other type that can identify the object. The mobile device is configured to capture one or more of temporal, spatial, topical and social attributes of the object. The captured information is analyzed and metadata associated with the object are retrieved. The metadata associated with the object is used to verify the identity of the object. A wish list of a user capturing the information of the object is automatically updated with the captured information and metadata. An aggregate list is generated for the object using information and metadata associated with the object from a plurality of users to determine the demand for the object. The progression of the object through various stages of the ownership cycle is tracked by dynamic demand calculation using the information of the object and the aggregate list.

By tracking the object through various stages of ownership cycle, suppliers and users can avail various benefits. For the suppliers, such as retailers, wholesalers, manufacturers, the information obtained through the tracking helps in determining the demand for the object so that they can plan the inventory, pricing, promotions, warranties, marketing accordingly. This helps the suppliers to retain their loyal customer base and attract more users. For the consumers or users, the automatic tracking of the object helps in determining the current demand of the object in the marketplace so that they can decide when to buy, when to sell, when and what objects to keep. Additional benefits for the users include automated tracking of various discounts, promotions, warranties, incentive programs that the user can avail so that the user can make informed decision on the purchase of the object and enrollment in various incentive programs, warranty programs, etc., for better cost benefits and to maximize the utility of the object.

It should be appreciated that the present invention can be implemented in numerous ways, such as, methods, a system and an apparatus. Several inventive embodiments of the present invention are described below.

In one embodiment, a method for managing a demand of an object is disclosed. The method includes capturing information about the object through a mobile device associated with a user. The mobile device is configured to capture information about the object that cover one or more of a spatial, temporal, topical and social attributes of the object. The identity of the object is verified and validated using metadata obtained based on the captured information. Upon successful verification and validation, a wish list of the user is automatically updated with the information and metadata of the captured object. An aggregate list is generated using the information and metadata of the object from a plurality of users. The aggregate list defines a source of demand for the object. The object is tracked as it progresses through various phases of ownership cycle by dynamic demand calculation using the information associated with the object and the one or more aggregate lists.

In another embodiment, a system for managing a demand of an object is disclosed. The system includes a client mobile device configured to capture information about the object. The captured information encompasses one or more of temporal, spatial, topical and social attributes of the object. The mobile device is equipped with an image capturing tool to capture an image or identification information of the object, a text capturing tool to capture textual information of the object and a display device so that the captured information can be rendered for verification. The system further includes a server. The server includes a demand management algorithm having a verification logic, an aggregation logic and a tracking logic. The verification logic is configured to interact with a metadata database available to the server to obtain metadata associated with the object in order to verify and validate the identity of the object. The metadata database is a repository used to store the metadata of a plurality of objects. The aggregation logic is configured to generate an aggregate list for the object by consolidating a request for the object from a plurality of users. The aggregate list defines a demand for the object. Additionally, the aggregate logic is configured to aggregate the various offers and incentives available for the object, dealers that deal with the object, loyalty programs that are available for the object so that the suppliers and users can plan on purchase, production, inventory, etc. The tracking logic tracks the progression of the object through an ownership cycle of the object based on the object's information and the aggregate list. The ownership cycle includes a plurality of phases with each of the plurality of phases creating a distinct list for the user associated with the object.

Thus, the embodiments of the invention provide a tool to track progression of an object through various phases of ownership cycle so that a demand for the object can be determined at various stages and used in inventory management, and ownership management. The tool further streamlines the various information associated with the object so that a user interested in the object may be able to make informed decisions about ownership. Similarly, the tool provides valuable input to the suppliers so that they can make informed decision about manufacturing, procurement and distribution of the object, including variations of the object.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
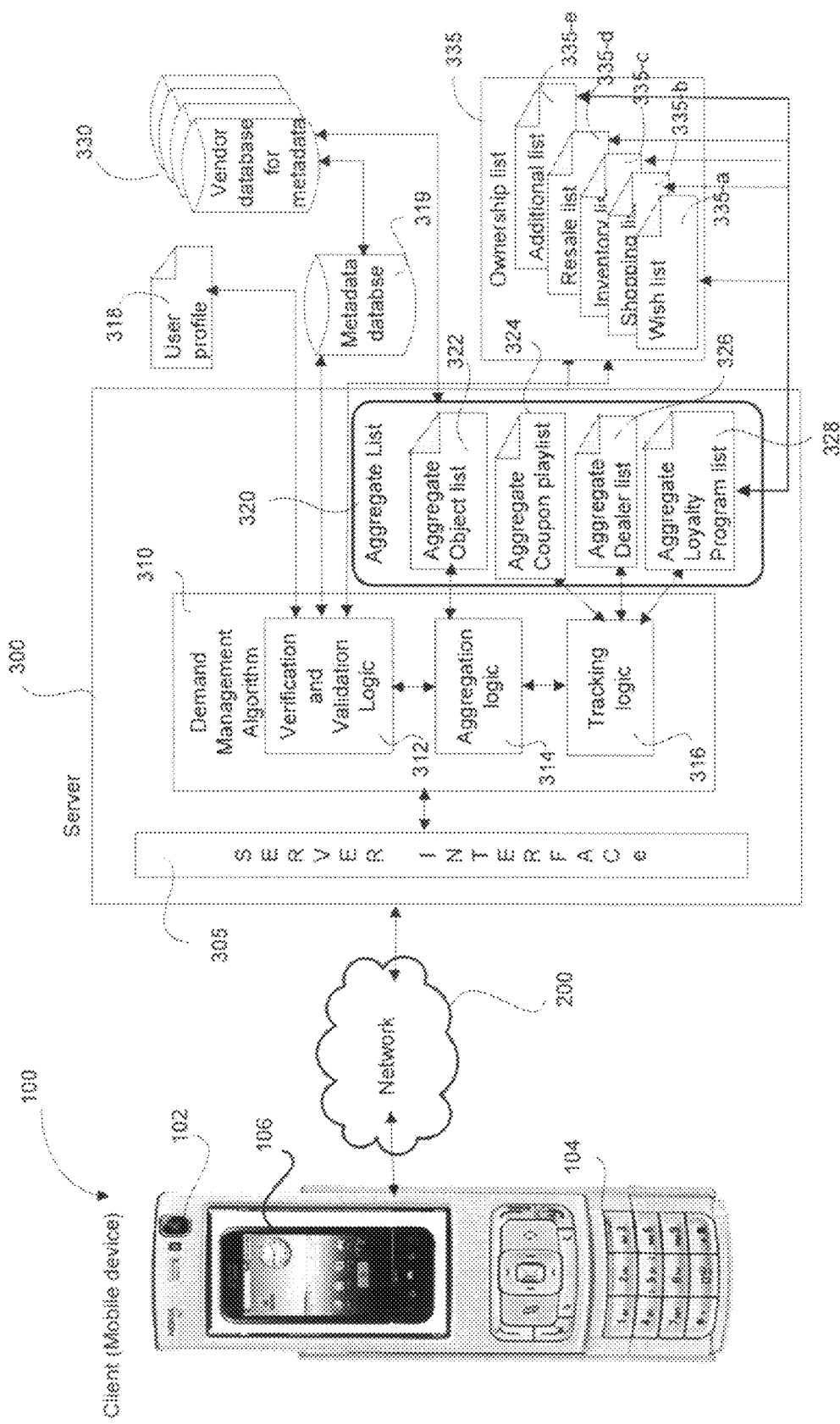
FIG. 1 illustrates a high-level block diagram of a generic computer system identifying various modules used for managing a demand of an object.

Broadly speaking, the embodiments of the present invention provide methods and systems for managing a demand for a physical object by bonding user identity and behavior to an object that has attracted the user's interest. The bonding to the object is extended through various stages of both a sales and purchase cycle as well as an ownership cycle. The embodiments of the invention use sensing technology to connect a consumer's interest and behavior to a physical object in the real world by generating appropriate representation of the object of interest and tracking its value to the user over time. The information about the real world object is used to articulate a list of objects that has captured the interest of a consumer and to use this information from a plurality of users to perform dynamic demand calculation for each object in aggregate or according to specific subsections of users based upon spatial, social, temporal or topical characteristics.

Towards this end, the embodiments use a mobile device, such as a mobile phone, gaming, GPS or other sensing devices, for capturing information associated with a physical object. The captured information is analyzed by a demand management algorithm to determine one or more of spatial, temporal, topical and social attributes of the object. An identity of the object is verified using the captured information and validated using metadata associated with the object and user profile. A wish list is generated using the captured information and metadata associated with the object, or the object is added to an existing wish list. One or more aggregate lists for the object are generated using the information and metadata associated with the object and the plurality of users. The aggregate lists define sources and stages of demand for the object. The progression of the object through research and purchase phases and then the various stages of an ownership cycle is tracked by dynamic demand calculation using the object information and the aggregate list. It should be noted that the aggregate lists may be nested based upon user attributes, object attributes or user or network preferences, e.g., the aggregate list for teenage males is nested in the list of all males or the list for San Francisco is nested in the list of California or the list for Saturday is nested in the list for weekend, or the list for physics is nested in the list for science. Thus, object demand may be tracked in aggregate but also according to any social, spatial, temporal or topical attribute of the objects and users.

The tracking of the object enables anyone connected to the system, including a supplier of the object to understand the demand for the object and adjust the inventory, pricing and incentives accordingly. For a consumer, the tracking enables streamlining all the information associated with the object including promotions, discounts, reviews, ratings, warranties and other incentive programs so that a user can take advantage of the various information and incentives to make informed decisions to maximize the lifetime value of the object to the user. Further, tracking may be dynamic in that as and when a user captures information of an object that the user is interested in, the object may be tracked to determine a demand for the object. Actions and interest of the user on the object may be driven based on the demand for the object or based upon user preferences or object attributes.

The embodiments describe a tool that takes real world objects and creates bindable relationship to the behavior of the user and uses this information to suggest optimal time for purchasing, selling, or owning an object. The complete flow cycle extends over the entire ownership cycle of the object from the time the user shows interest in the object, through researching, testing, purchasing and owning of the object till the object is discarded or sold. The tool provides the ability to keep track of the object and streamline information associated with the object so as to provide suitable recommendations pertaining to the ownership of the object at various stages thereby enriching a user's ownership experience. A sensing technology captures one or more of spatial, topical, social and temporal attributes associated with the object so as to enable the user to take advantage of the various programs associated with the one or more attributes of the object during the various stages of ownership based on the user's interest in the object. The information associated with various programs are dynamically obtained so that the user is provided with up to date information making this a more robust and useful tool for managing the demand for an object. The tool also enables comparison shopping for the object using the streamlined information so that the user can determine the best deals for buying or selling the object. The tool provides dynamic demand analysis for the object so that the vendors associated with the object may make informed decision on the price, discounts, incentive programs, warranties, inventory, etc., enabling the vendors to take full advantage of the demand for the object for a greater return on investment.

The embodiments of the invention may be broadly classified into three major processes that encompass the complete ownership cycle—Sensing and Data Aggregation process, Meta-Loyalty process and Super Barcode process. The sensing and data aggregation uses sensing technology and information capturing devices to capture information of an object in which the user has expressed interest and aggregate the information of the object from a plurality of users to generate an aggregate list that can be provided to various vendors/users for making informed decisions. The sensing and data aggregation process covers an initial phase of an ownership cycle, which includes interest expression phase. The meta-loyalty process analyzes, aggregates and streamlines information from various incentive programs available for the object and automatically enrolling the user into one or more incentive programs and/or providing recommendations to users interested in owning/selling the object. The meta-loyalty process encompasses the second, third and final phase of the ownership cycle, which includes the purchasing phase, ownership phase and reselling phase. The super barcode process encompasses the second phase of the ownership cycle, the purchasing phase. The super barcode streamlines the shopping process by automatically integrating information from different vendors associated with various objects in a shopping cart, generating payment information for the objects in the shopping cart and encoding the payment information along with applied discounts into a unique barcode. During every phase of the ownership cycle the tool provides dynamic demand analysis so that users and vendors can effectively base their decisions related to the object.

It should be understood that the demand management algorithm can be in the form of a code running on one or more servers, or hardware and software. The demand management algorithm code does not have to be integrally coupled to the server but be available to the server. Towards this end, each of the various phases of the ownership cycle will now be described in details.

Sensing and Data Aggregation:

Sensing and data Aggregation is a first phase of an ownership cycle for an object. In this phase, a user's interest in an object is captured based on a user's behavioral pattern and binding the user's identification with the object based on the user's behavior. The behavior of the user can be captured in any number of ways, including capturing information of the object using a mobile device, tracking a user's behavior towards the object, such as sensing the amount of time a user spends looking at an object on display at a store window using a sensing device, sensing the number of times a user visits a particular store, such as Starbucks, etc., through transaction logs and mobile device. Capturing such behavioral patterns of a plurality of users is helpful in determining the interest of the users towards an object thereby determining a trend in the demand for the product and tailoring appropriate programs to promote the object to the intended audience.

FIG. 1 illustrates a high-level block diagram of a generic computer system identifying various modules used for managing a demand of an object. The computer system includes a mobile device 100 for capturing information of an object that catches the interest of a user. The mobile device 100 is equipped with an image capturing tool 102, such as a camera, a text capturing tool 104, such as a keyboard or keypad, and a rendering device 106, such as a screen/monitor for capturing and rendering information of the object. The information captured by the mobile device 100 could be an image of the object or identification information of the object, such as bar code, radio frequency identification (RFID) code, or any other form of identification. The capturing tool 102 is further configured to capture one or more of spatial, temporal, topical and social attributes associated with the object. The spatial, topical, social and temporal attributes associated with the object determine the where, who, when and what is being captured or simply the W4 aspect associated with the object. The text capturing tool 104 is configured to capture textual description about the object and to provide additional user preferences. The rendering device 106 is configured to render the captured information of the object and to verify the identity of the object that has caught the interest of the user. The mobile device 100 is configured to transmit the information to a server 300 through a network 200. The transmission of the information to the server 300 could be through a wired or wireless connection.

The server 300 includes a server interface 305 that interacts with one or more client devices, such as the mobile device 100, to exchange information between the server 300 and the mobile device 100. The server 300 further includes a demand management algorithm 310 that includes logic to receive the information from the client device 100 through the server interface 305 and performs dynamic demand analysis based on the user's interest in the object. The results of the dynamic demand analysis performed at various stages of an ownership cycle are used to provide useful information to the user so as to determine the demand for the object and make informed choices towards ownership of the object and to the vendors so as to manage the supply for the demand of the object.

The demand management algorithm 310 includes logic to perform the dynamic demand analysis including a verification and validation logic 312, an aggregation logic 314 and a tracking logic 316. The verification and validation logic 312, aggregation logic 314 and tracking logic 316 within the demand management algorithm 310 may be integrated into a single code or may be maintained as distinct set of codes within the demand management algorithm 310. The verification and validation logic 312 is configured to receive the information associated with the object of interest, from the mobile device 100, analyze the information to identify the object, and interact with a metadata database to obtain metadata information for the object that matches the information of the object. As indicated earlier, the information associated with the object may include images, barcodes, RFID codes or any other identification information. In one embodiment, the information transmitted to the verification and validation logic 312 by the mobile device 100 is an image of a real-world object. The image is analyzed by the verification and validation logic 312 to identify the object. In one embodiment, the image may be analyzed to identify the object and the identification information is then used in obtaining the metadata for the captured object. In another embodiment, the image may include a barcode or any other identification information associated with the object. In this embodiment, the barcode or other identification information is used to obtain the metadata information for the object. The metadata information is then rendered at the mobile device 100 for confirmation to ensure that the metadata relates to the object that has captured the interest of the user.

The verification and validation logic 312 also interacts with a user profile database 318 to determine the preferences of the user interested in the object. The user profile database 318 is a repository of user preferences of a plurality of users towards a plurality of objects. The personal preferences of a user are captured by the mobile device 100 and maintained in the form of a distinct user profile in the user profile database 318. It should be noted that the user profile for a user may include profiles of other users related to the user in addition to the user's own profile.

In one embodiment, the captured information transmitted by the mobile device includes information associated with the user, such as a user ID. In one embodiment, the identification information associated with the mobile device capturing the image of the object may be used as user identification or may be used to obtain user identification information. The user identification is then used to obtain user profile information from the user profile database 318. The information and metadata associated with the object captured by the mobile device 100 is then verified against the user's profile to ensure that the user preferences match that of the object's information. Upon successful validation, the information for the object is used to generate a wish list for the user if none exists or update the wish list, if one exists. If the validation is not successful, the verification and validation logic 312 requests and receives additional user preferences from the mobile device 100. The additional user preferences define useful variations to the object. These useful variations are also included in the demand analysis to measure the demand for the variations on the object. The additional user preferences are then stored along with the object information in the wish list 335-a for the user and are also updated to the user's profile in the user profile database 318 for future reference.

The wish list for each user is maintained in a wish list database 335-a that is available to the demand management algorithm 310. The wish list database 335-a may be maintained at the server 300 or may be maintained at a different server and made available to the demand management algorithm 310. Further, the updated wish list for the user may be forwarded to the mobile device 100 so that the wish list may be maintained locally and be available to the user when the user needs to view the items on the wish list. The wish list may be provided to vendors so that the vendors may be able to determine the demand for each object on the wish list and tailor the supply, price, promotions, incentive programs accordingly. An aggregation logic 314 within the demand management algorithm 310 is used to consolidate information associated with each of the objects in the wish list of a plurality of users. The aggregate list for an object 322 may be generated on demand or may be automatically generated at pre-set periods of time. The aggregation logic 314 generates distinct lists for each of the objects in the user's wish list. The aggregation list 322 for an object defines user's interest in the object based on one or more of the spatial, temporal, topical and social attributes and may be used by vendors to determine the demand for the object and other attributes associated with the object. As a large number of users in a specific geographic, social, temporal or spatial region are clustered and are showing interest or wanting the object, evidenced by the number of users capturing the same or similar object, the aggregate data can be used by the vendors in the supply chain, such as manufacturers, wholesalers and/or retailers in order to determine demand for the object. The vendors in the entire supply chain may then use the aggregate data to adjust prices according to demand on-the-fly, for instance. Once the object is added to the wish list of the user, the object is tracked through the complete ownership cycle using the algorithm.

As the object progresses through various phases of the ownership cycle, the tracking logic 316 within the demand management algorithm 310 interacts with the aggregation logic 314 and other modules available to the algorithm 310 to generate distinct aggregate lists 320 in order to provide additional information and recommendations to the users and vendors along the supply chain as explained in detail further down. For instance, during a purchase phase, the tracking logic 316 interacts with a vendor database 330 to obtain all the offers and discounts available for the object and with the aggregation logic 314 to generate an aggregate coupon playlist 324. Similarly, during an ownership phase, the tracking logic interacts with a plurality of vendor databases 330 to obtain loyalty, warranty, and repair program information and interacts with the aggregation logic 314 to generate an aggregate loyalty program list 328. During a reselling phase, the tracking logic interacts with a plurality of vendor databases 330 to obtain a list of dealers/sites that deal with the object that is for resale and with the aggregation logic 314 to generate an aggregate dealer list 326. The tracking logic further manages the object through various phases of the ownership cycle. When the user expresses interest in an object, the object is updated into the user's wish list 335-a, when the user is ready to purchase the object, the object is moved from the user's wish list 335-a to the user's shopping list 335b. When the user purchases the object, the object is moved from the user's shopping list 335b to the user's inventory list 335c. When the user shows interest in selling the object, the object is moved from the user's inventory list 335c to the user's resale list 335-d. When the user sells the object, the object is removed from the user's resale list and is moved into a new user's wish list 335-a or shopping list 335b and the ownership cycle continues. It should be noted that the ownership list is not restricted to the aforementioned lists, 335-a through 335-d, but may also include other additional lists 335-e representing other phases of interest or ownership that a user may want to create, such as research list, etc. In one embodiment, the lists that are generated are object centric. It should be noted that the lists can be generated as "tags" or label centric lists wherein one or more objects are associated with a tag/label and the various lists are generated based on these tags. Each of the list from the different phases of the ownership cycle are maintained in an ownership list 335. The ownership list is a database of all objects that the user is interested in, owns, has purchased and is interested in selling encompassing the complete ownership life cycle.

Figure 2:
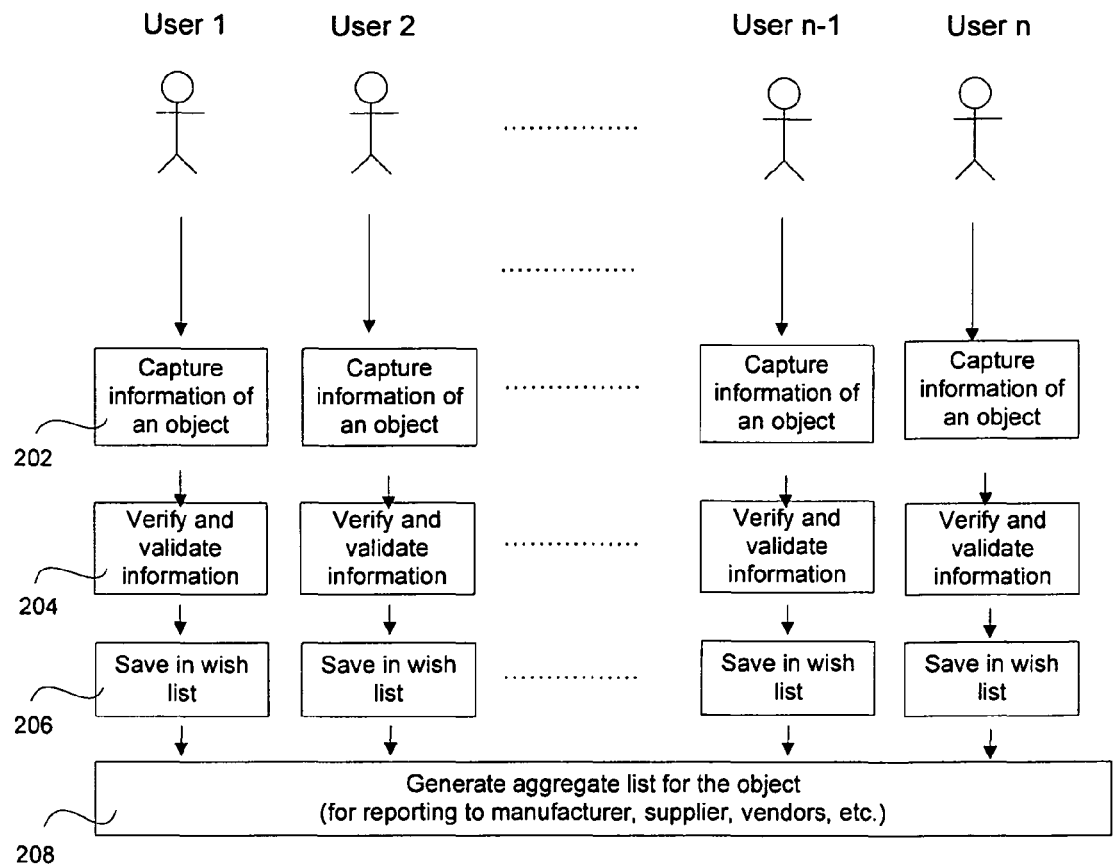
FIG. 2 illustrates a sample process flow for generating an aggregate list for an object, in one embodiment of the invention.

FIG. 2 illustrates a simplified block diagram depicting the process flow for generating an aggregate list, in one embodiment of the invention. As shown, a user captures information of an object using a mobile device, as illustrated in operation 202. The captured information is transmitted to a server through a network using wired or wireless connection. A demand management algorithm at the server uses the captured information to identify and retrieve metadata information from a metadata database. The algorithm also uses the captured information to identify and retrieve user profile for the user capturing the information. The captured information is verified and validated using the user profile and metadata information and an identity of the object is established, as illustrated in operation 204. Upon verification and validation, the captured information is updated to a wish list of the user based on the interest of the user towards the object, as illustrated in operation 206. The wish list is also updated with the metadata and user profile information relevant to the object. An aggregation logic within the demand management algorithm retrieves a plurality of users wish list for the object and uses the information from the wish lists to generate an aggregate list for the object, as illustrated in operation 208. The aggregate list for the object includes captured information and metadata information along with user profile information that is relevant to the object.

In the case where the object information is not validated, additional user preferences are received from the mobile device through a user interface. The additional user preferences reflect variation to one or more characteristics that further defines the object. The additional user preferences are updated to the user profile, aggregation list and to the wish list of the corresponding user so that the lists reflect the variations to the object requested by the user. The aggregate list may be shared with one or more vendors associated with the object so that the vendor can determine the demand for the object including demand for the variations to the object so that the vendor can use the information to strategically market the object and related accessories and provide promotions and incentives for the object based on the analysis of the aggregate list. The aggregate list for the object can be generated dynamically on demand or during pre-set periods of time.

Showing interest in an object is the first phase in the ownership cycle. The remaining phases of the ownership cycle include purchasing phase, ownership phase and resell phase. The algorithm tracks the progression of the object through the various phases of the ownership cycle and provides strategic and timely information to both the vendors and the users so that the vendors and users can make informed decisions.

Figure 3:
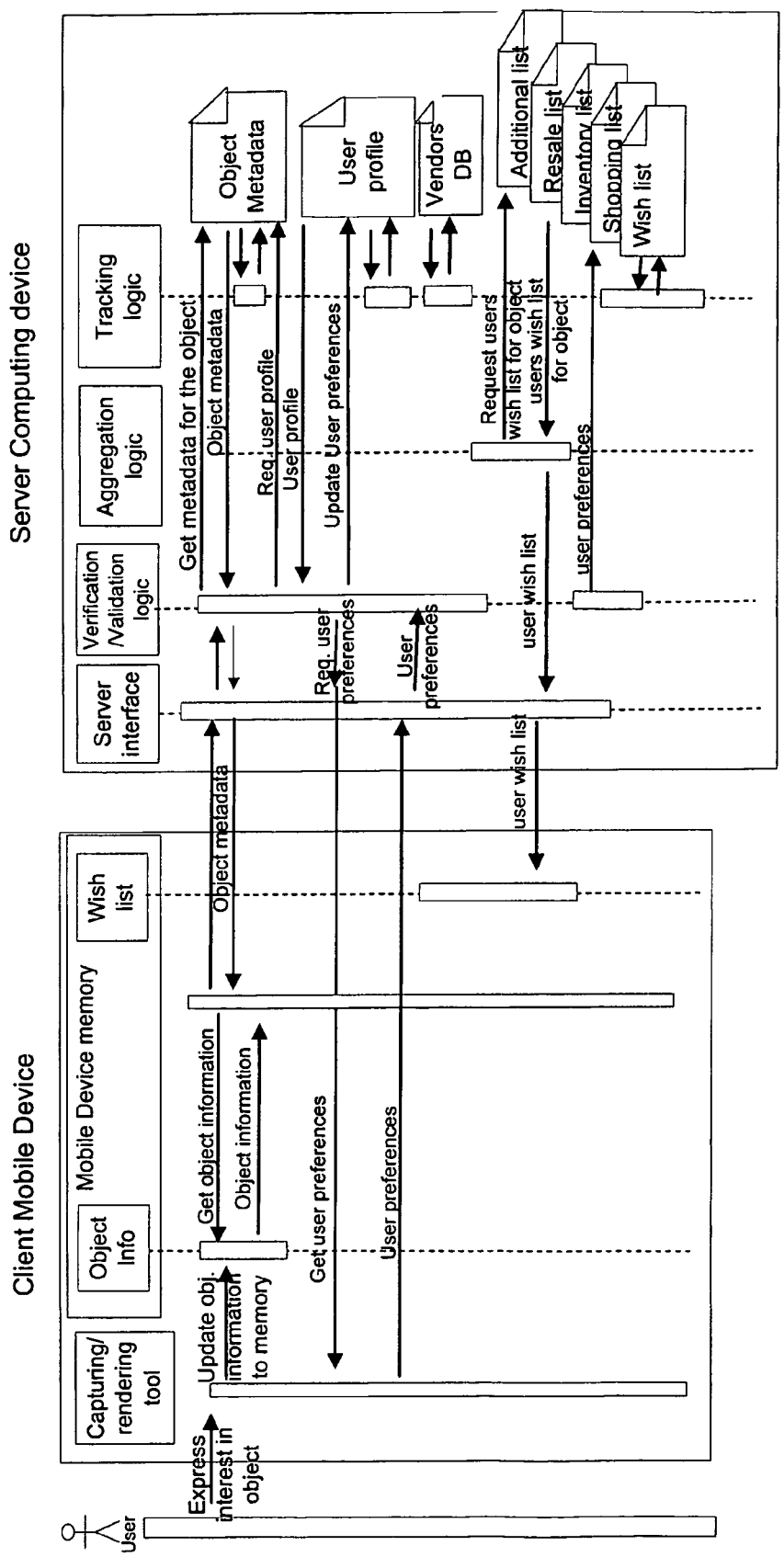
FIG. 3 illustrates a sample data flow during various phases of an ownership cycle for the object, in one embodiment of the invention.

FIG. 3 illustrates a simplified data flow diagram for generating a wish list used to generate an aggregate list for dynamic demand analysis for an object, in one embodiment of the invention. FIG. 3 also identifies the data flow diagram as the object progresses through various phases of the ownership cycle. The data flow diagram begins with a user expressing interest in an object. The interest in the object can be captured by a sensing or capturing device. In one embodiment, the sensing device may include various technologies to determine a user's interest in the object. In one embodiment, the sensing technology may include an eye-tracking device to determine the amount of time a user spends looking at the object. Based on a threshold limit, the sensing technology may be able to capture information of the object and transmit the information to the server as an object of interest for the user. In another embodiment, the capturing device, such as a camera in the mobile device, may be used to capture the information of the object and transmit the same to the server. The information captured may include any one or more of image, text, barcode, RFID code, or other identification information that can be used to uniquely identify the object. The captured information is analyzed to determine an identity of the object and is stored in the memory within the mobile device. The captured information along with the identity obtained through the analysis is transmitted to a server through a network, such as an Internet.

A demand management algorithm at the server receives information about the object through a server interface and verifies and validates the information using a plurality of logics. A validation logic queries a metadata database available to the algorithm by sending in a request for metadata and obtaining the metadata information for the object in response to the request. The metadata is used by the validation logic to validate the identity of the object based on the captured information. The metadata database is a repository of metadata information for various objects obtained from various sources. The metadata database does not have to be integrated with the server but can be distinct and be available to the algorithm on the server. In addition to requesting metadata information, the validation logic may send a request for user profile information to a user profile database. The user profile database, in response to the request, forwards the user profile information pertaining to the user interested in the object based on the user identification provided in the captured information. The captured information may include one or more of the W4 attributes and may also include the identification of the user capturing the information of the object. In one embodiment, the user identification may be identification of the mobile device associated with the user through which the user identification may be obtained. The validation logic validates the captured information of the object against the metadata and the user profile information and establishes the identity of the object.

Upon successful validation, the information and metadata associated with the object are updated to a wish list of the object for the user. If the validation of the object is not successful, a request for additional preferences is transmitted from the validation logic on the server to the mobile device of the user through the server interface. The request for additional preferences is received at the mobile device and, in response, the mobile device forwards one or more additional user preferences further defining the object to the validation logic at the server. The validation logic updates the additional preferences to the corresponding user's wish list and metadata associated with the object. The validation logic also updates the corresponding user's profile so as to reflect the updated information about the object that has captured the interest of the user. The updated user profile and wish list are transmitted back to the mobile device for storage at the local memory so that the user profile and wish list can be readily accessed.

An aggregation logic may, from time to time, forward a request for the user's wish list in order to generate an aggregate list for an object. In response, the wish list database will forward the wish list of a plurality of users who are interested in the object. The aggregate list may be used to analyze and determine the demand for the object and the results of the analysis may be forwarded to the vendors for planning inventory and offers. The object in the wish list is tracked as it progresses through the various ownership phases by a tracking algorithm and at every phase a request for the information of the object, a request for information of the user, a request for information of the vendors that deal with the product and a request for the object from one of the distinct lists is automatically made by the tracking logic so as to analyze the information and provide useful information to vendors and users.

Figure 4:
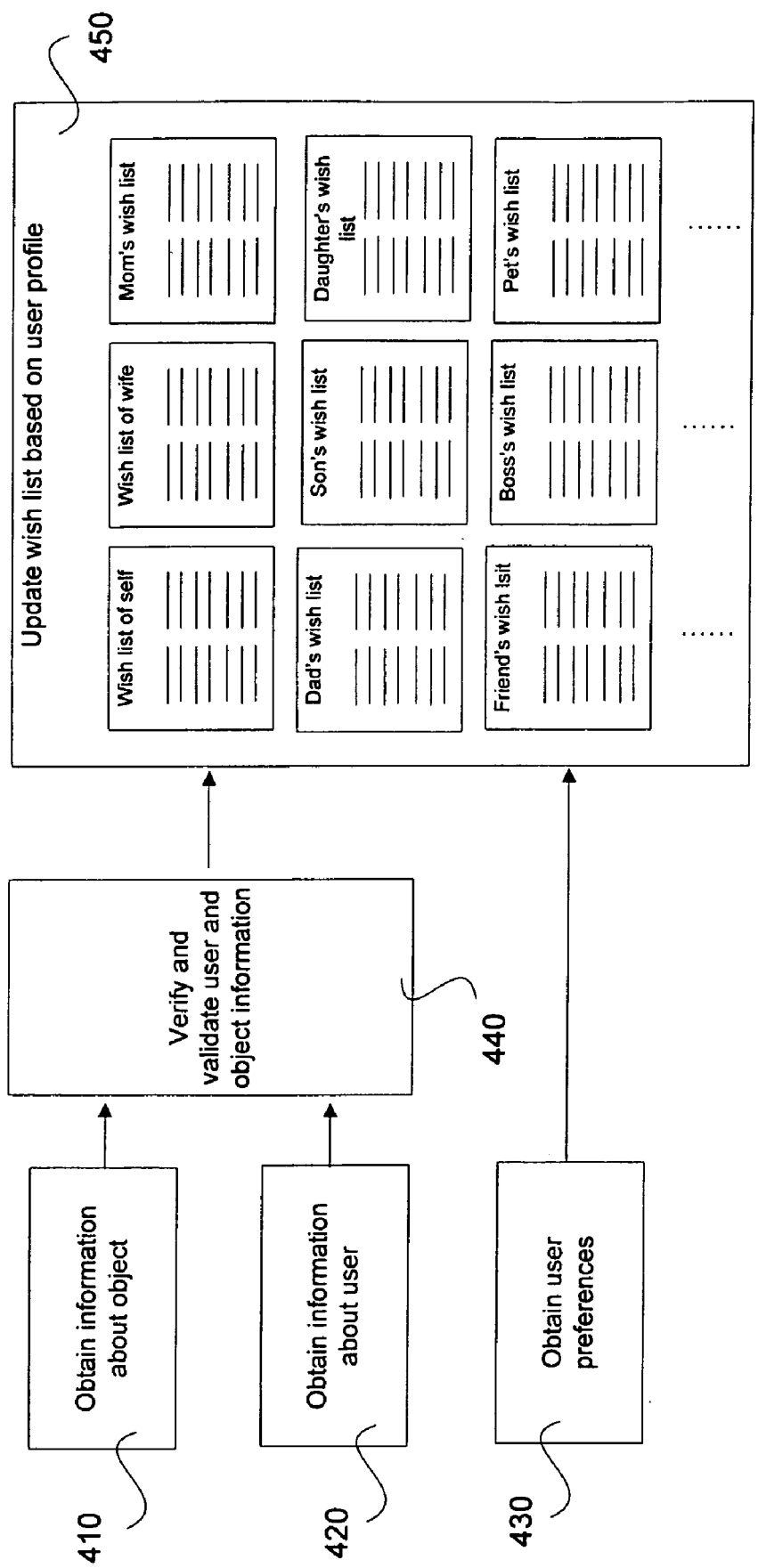
FIG. 4 illustrates a simplified block diagram for generating wish list, in one embodiment of the invention.

FIG. 4 illustrates a simplified block diagram depicting the structure of a wish list generated during the initial phase of the ownership cycle. Information about an object 410 and information about an user 420 are obtained during validation of an object whose information was captured at a mobile device of a user. The object and user information are used by a validation logic to verify and validate 440 the identity of the object based on the user and object information. Upon validation the object is added to a user's wish list 450. As shown, the user's wish list 450 may include a plurality of wish lists for relatives and friends of the user so that the information can be readily available to the user when shopping. As an example, the user's wish list 450 includes user's own wish list along with wish lists of his wife, mom, dad, son, daughter, friend, boss and pet. When the user shows interest in an object, the wish list of the user along with the wish lists of the user's relatives and friends is parsed to determine whose profile needs to be checked during object information validation. For instance, the user's profile shows user's preferred color as green, shirt size as medium or 15, preferred shirt style as collared or polo neck and the user shows interest in a brown turtle-necked sweater in extra small size, the validation logic may verify the object information against the user's own profile. If there is no match, the wish list of friends and relatives are parsed to determine if any of those profiles fits the object information. If any of the other user profile fits the object information, the object information is updated to the corresponding wish list of the user. The validation logic may additionally request confirmation from a user prior to updating the information to the wish list of the user. If the object information does not match any of the user profiles in the user's wish list, then the validation logic may request additional user preferences 430 that match the object of interest. The additional user preferences are then updated to the user wish list and to the user's profile for future references. The invention provides a tool to auto-tag an object based on a specific user's profile available at the user's mobile device.

In addition to the auto-tag feature, the invention also provides an auto-complete feature when browsing for the object in a store. The auto-complete feature uses the W4 capability of the mobile device to determine the store the user is browsing in and then use the auto-complete feature in the algorithm to match the user's request/interest with the inventory in the store. For instance, when a user enters a Nike™ store and is looking for a particular product, the auto-complete feature in the device along with the built-in W4 capability will know that the user is in the Nike™ store and will auto-complete the user's request with the inventory in the store. This feature, along with access to available inventory discussed in detail below, enriches a user's shopping experience.

In another embodiment, the demand management algorithm may use the temporal, spatial, topical and social attributes of the object to determine object information that fits the profile of the user. For instance, if the user is approaching a Nike™ store or is in the Nike™ store browsing, the validation logic may be able to query the store's available inventory database using the topical attribute to determine if the store carries the object that the user is interested in which fits the user's profile. If the store does not carry the object in the style, color, or size fitting the user's profile, the demand management algorithm dynamically adds the object to the wish list which then dynamically places a request for the object that fits the user's profile at the store. Thus, the algorithm not only provides validation but also ensures that the object meeting the user's profile is in stock and available.

An aggregation logic at the algorithm may be used to receive and consolidate the information about the object from the wish list of a plurality of users as and when needed or at pre-set periods of time. The aggregation logic interacts with the wish list database to identify the wish lists of a plurality of users that include the object and obtains the information for the object from the identified wish lists to generate an aggregate list for the object. The aggregate list defines a demand for the object and can be shared amongst various vendors so that the vendors can analyze the demand and use the analysis to determine how to strategically market the object and related accessories, determine the type and nature of promotions and incentive programs to provide. Some of the vendors that might be interested in the aggregate list include manufacturers, wholesalers, retailers, resellers, etc., that deal with the object and accessories. The users, in turn, may use the demand analysis to base their purchase.

Once the object has been updated to a wish list, the algorithm tracks the progression of the object through various phases of the ownership cycle. As the object progresses through the various phases, the metadata surrounding the user's desire for the object drives the supply chains desire to move the object along the ownership cycle by providing discounts and incentives at various phases of the ownership cycle. A tracking logic within the algorithm helps in tracking the object through various phases of the ownership cycle. When the object is added to the wish list, the tracking logic queries a plurality of databases associated with the vendor to obtain information, such as pricing structure, market trends related to the object, promotions, discounts, etc., associated with the object. The information is then analyzed to determine the best time to purchase the object, the various discounts and promotions available for the product, etc. The tracking logic returns the results of the analysis in the form of recommendations indicating the best time, place and price for purchasing the object, the various discounts and promotions available. The tracking algorithm uses the W4 attributes of the mobile device to determine the various options and to provide appropriate recommendations. The user can review the recommended results and decide on whether to purchase the product or not. Thus, the algorithm provides a useful and concrete analysis tool that benefits both the users and vendors during the ownership cycle.

Super Bar-Code:

In addition to showing interest in the object, the user may want to purchase the object. Showing interest in the object defines the first phase of the ownership cycle while purchasing the object defines the second phase. As mentioned earlier, once the object is updated to a wish list of a user, the progression of the object is tracked by the tracking logic within the algorithm. The tracking logic interacts with a plurality of databases to obtain the various offers and promotions available for the object during purchase, sale and ownership phases of the ownership cycle so as to provide this information to the user in a seamless and timely fashion so that the user can make informed decisions.

In one embodiment, upon detecting an object in the shopping list, the tracking logic scours a plurality of stores within a predefined distance to determine the stores that carry the object and analyzes the data associated with the object collected from the identified stores databases to determine best price and best time to buy the object. In one embodiment, the tracking logic uses the user preferences for the object to identify the stores that carry the featured object. Some of the user preferences may include preferred color, style, features associated with the object and preferred distance of the store that the user is willing to travel to obtain the object. In one embodiment, the tracking logic first scours the stores that are affiliated with a search engine of the system. If the object is found within one or more affiliated stores, then the tracking logic analyzes the data from each of the stores to provide the recommendations. If the object is not found in any of the affiliated stores, the tracking logic may first try stores that are affiliated with the affiliated or sponsored stores and then tries affiliated brands. Additionally, the tracking logic may use the W4 features to determine stores on the user's route to provide recommendations for the best place to buy. If the object is not found in any of the stores, then the tracking logic may try some of the online outlets to determine if the object can be obtained through an online purchase. If all of the alternate options fail, the tracking logic may query the manufacturer directly to determine if the manufacturer will allow for a special order for the user. The data from various alternate options are accumulated and analyzed to determine the best place, time and price to buy. Based on the analysis, the tracking logic may provide a set of recommendations for buying the object. Additionally, the tracking logic may place a request for the object in any one of the demand databases belonging to one or more vendors in the supply chain and may generate options to be informed when the object is available. The vendor database may collect a plurality of such requests and perform dynamic demand analysis to determine if there is sufficient demand for the object that warrants manufacturing or stocking the object. The user may decide on any one of the recommended vendor/store/site to buy the object, based on the analysis.

During the purchasing phase, the user purchases the object by placing it in a shopping cart. In one embodiment, the mobile device of the user is used to scan the object(s) in the shopping cart and interacts with the server to transmit the scanned information to the tracking logic on the server. The mobile device, in this embodiment, includes a scanning tool to enable scanning of the object in the shopping cart and to interact with a server to transmit the scanned information of the object. A tracking logic within a demand management algorithm on the server interacts with the wish list database available to the server to determine if the object is on the wish list of the user. If the object is on the wish list of the user, the tracking logic moves the object from the wish list to the shopping list of the user upon determining that the user shows interest in purchasing the object. If the object is not on the wish list of the user, then the algorithm updates the shopping list of the user with the information of the object.

In another embodiment, the tracking logic may review the objects in the wish list of the user, identify a trend for the object in the marketplace and suggest or recommend the best time to buy the object, based on user profile. The tracking logic may also assist the user in comparison shopping by analyzing data from various vendors and suggesting or recommending the best place and price to buy the object. The user may decide to purchase the object based on the recommendations received from the tracking logic.

During the update to the shopping list, the tracking logic queries the metadata database to identify the metadata information for the object using the scanned information. It should be noted that the metadata database for various products are maintained at the respective vendor sites and are available to the demand management algorithm on the server. The metadata database may be distinct or may be integrated with the product database within the vendor sites. The tracking logic also queries the user profile database to obtain the user profile of the user. The user profile is compared to the scanned information and metadata of the object to determine if the user profile matches the object information. If the object information matches with the user profile, the object information along with the metadata information is updated to the shopping list of the user. If the user profile does not match the object information, additional user preferences representing variations to the object are obtained by the tracking logic through a request to the mobile device. The additional user preferences are updated to the user profile for future reference. The object information along with the metadata and additional user preferences are updated to the shopping list of the user.

In one embodiment, the tracking logic may also interact with a user feedback database to obtain feedbacks from various users who have purchased the object. The user feedback database is a repository of user feedbacks obtained from various users for one or more objects and may be available to the algorithm on the server. The tracking logic analyzes the user feedbacks and provides one or more recommendations based on the analysis. The user feedback is important in understanding the acceptability trend for the object in the marketplace, which also affects the demand for the object. For instance, if an object receives favorable feedback, then the tracking logic may recommend buying of the object and the user may be influenced to buy the object based on the recommendation as against an object that has received unfavorable feedback. The user may, thus, base his/her decision on purchasing the object based on the demand analysis and recommendations from the tracking logic.

Once the user scans the object in the shopping cart, the object is moved out of the wish list and updated to the shopping list. Upon updating the shopping list of the user, the tracking logic within the algorithm is used to identify the object in the shopping cart, query one or more vendors databases to identify and obtain all the offers and promotions, such as discounts, incentive programs, services, and ancillary products, available for the object. The tracking logic analyzes the various incentive information to determine the incentive programs, discounts, services, ancillary products, etc., that provide the best deal for the user. In one embodiment, the tracking logic will automatically update a "coupon playlist" for the user with the various discount offer information. The coupon playlist acts as a repository for storing discounts from various vendors that are applicable to the object. Further, the tracking logic analyzes information available for the object, such as market trends, price structure, seasonal variations, etc., and generates a set of recommendations based on the user profile and presents the recommendations to the user.

In addition to tracking various offers and incentive programs for the object, the tracking logic may also perform "price-matching" for the object by comparing the price and deals from one physical store to another and recommending the best place and price to buy the object. The tracking logic may provide further service to the users by tracking the price of the object even after the purchase of the object. If the price of an object comes down soon after the user bought the product, the tracking logic keeps track of the price at the vendor and provides an alert to the user so that the user may be able to request a refund. In this instance, the tracking of the price is performed for a short period of time after the purchase of the object.

As the user proceeds to the checkout, the tracking logic aggregates the information from the coupon playlist that itemizes all the discounts and incentives available to the one or more objects in the shopping cart and generates a super-barcode for the purchase. The super-barcode is an aggregated barcode that uniquely identifies the current purchase of the user and is encoded with the information of all the objects within the shopping cart. The tracking logic also consolidates the various discounts and integrates it into the purchase price of the objects in the shopping cart. In addition to aggregating the discounts, incentives and information of the objects in the shopping cart, the aggregation logic also encodes payment information associated with the user into the super-barcode. For instance, super-barcode can contain information on the payment mechanism, such as credit card number, expiration date, card security value (CSV) codes and any other payment information in order to complete the purchase. The super-barcode is then transmitted to the mobile device of the user for rendering on a display device associated with the mobile device. Once at the checkout, the user needs to just provide the super-barcode rendered at the mobile device to the checkout clerk and the user can proceed through the checkout. There is no need for the checkout clerk to rescan the objects in the shopping cart or the user to provide payment information or discount coupons as the super-barcode includes all the objects in the shopping cart along with various discounts applied to the objects along with payment information. If, however, the checkout clerk wants to scan the objects in the shopping cart, he/she may do so. Once the checkout clerk has scanned all the objects and totaled up the order, the super-barcode from the mobile device is scanned. The register reads the barcode, extracts the discounts, tallies up the new payment total, extracts the payment information from the barcode and registers a payment for the purchase. Additionally, the total savings are tallied and registered in the user's shopping list database. The tally, discounts and payments are all handled in one action.

The savings to the user can be tallied in different ways. In one embodiment, the register at the store has intelligence to scan the super-barcode, compare the list of discounts embedded in the barcode to the list of objects in the shopping cart, and apply the discounts in order. If the register does not have requisite intelligence, the barcode also provides a total discount along with the list of objects in the shopping cart on the display device of the mobile device. The checkout clerk has to just visually check to confirm the objects and the related discounts and apply the discounts to the objects in the shopping cart. The total payment is then reduced by the total discounts and the payment details are registered and applied to the user's shopping list database. Thus, the algorithm provides a tool to streamline the various operations involved when purchasing an object, such as reviewing various offers and incentive programs for the object, analyzing the offers and incentive programs and presenting the information to the user or automatically applying the incentives, such as discounts, to help the user in making decisions or in benefiting from the information in relation to the object. The user does not have to scan, clip or print coupons or even keep track of the various discount offers. The algorithm automatically keeps tab of the various discounts and automatically presents the discounts at the user's mobile device during purchase. For the checkout clerk, the tool streamlines the operations of scanning the objects, applying the discounts, and applying the payment, resulting in a thorough and hassle-free shopping experience.

Upon detecting payment for the objects in the shopping cart, the tracking logic moves the items in the user's shopping list to the user's inventory list. The tracking logic aggregates the purchase data of a plurality of users on demand or at pre-set periods of time and forwards the information to the manufacturer/vendors in the supply chain. The aggregate information can be used by the vendors in the supply chain to determine the trend in the demand. In one embodiment, the aggregate information identifies one or more of the W4 attributes associated with the object so as to help the vendors in providing more focused incentives to the users. The incentives associated with the vendor may include additional discount offers based on one or more W4 attributes associated with the object or could be ancillary products, which could enhance the utility of the original object. In addition, the user may be automatically added to an owner's club for the object.

As the object gets used by the user, feedbacks about the product may be requested by the vendors. In some cases, as part of purchasing the object, the user may be allowed to opt-into a data collection procedure on the usage of the object, in order to assist the vendors in the supply chain to build better products, revise the products while in the user's possession or provide free services in addition to the product. The algorithm is used during the purchase and ownership phase to enable the vendors to better understand the demand trend, utility and reliability of the object so that the vendors can tailor the inventory, discount offers and incentive programs accordingly.

In one embodiment, at some point after purchasing the object, the user may decide that the user does not need the object anymore and may be interested in selling the object. The user may also decide to sell the object to maximize profit based on observed market trends for the object. The tracking logic assists the user in selling the object by providing dynamic demand analysis and recommending vendors that may assist in selling the object. In another embodiment, the tracking logic may review available inventory of an object and calculate demand value for that object. As the tracking logic has access to plurality of users' wish lists, inventory lists, and other ownership related lists based on transaction logs, etc., the tracking logic is able to analyze the demand for the object using the aforementioned users lists. A user may or may not be interested in selling the object. However, the user may set a threshold value for the object and wish to be informed when the value of the object reaches or exceeds the threshold value so that the user may be able to make informed decisions based on the demand. The tracking logic will track the value of the object based on the demand and informs the user when the object reaches or exceeds the threshold value. At this time, the user may wish to sell the object. When the user shows interest in selling the object, the tracking logic queries and receives a list of vendors/retailers and/or sites that deal with the object that may assist the user in selling the object. The tracking logic analyzes the list of vendors/retailers and/or sites based on information associated with the vendors. The analysis of the information associated with the vendors may determine the reputation, results obtained, ease of conducting business, etc., and provides a list of recommended dealers/retailers/sites to the user for using to market the object identified for resale. The tracking logic may use a user feedback database to obtain feedback from users for the vendors/retailers and sites to assist in the analysis. The user may enlist the object at any one or more of the vendors/retailers to sell the object based on the recommendations from the tracking logic.

As mentioned with relation to the buying of the object, the tracking logic may automatically review the objects in the inventory list of a user, analyze the current trend in the market for each of the objects in the inventory list and provide recommendations for the best time, place and price to sell the object. For instance, the tracking logic may identify a book that the consumer bought from an online web site, such as Amazon™, six months or a year ago by reviewing the transaction log associated with the object in the inventory database and may suggest that it is time to sell the book. In another instance, the tracking logic may identify an object in the inventory list that is in high demand in the marketplace based on market trend analysis for the object and automatically recommend to the user to sell the object to obtain premium price on the object. The tracking logic reviews the upward trend in the price of the object and bases the recommendation for selling the object on this review. The algorithm creates an opportunity for secondary resale market. By using the inventory list, the algorithm is able to provide dynamic demand analysis and recommendations on-the-fly to enable the user to reap maximum benefit from the object.

In addition to providing recommendations for the user with reference to the best time to sell the object, the tracking logic may provide recommendations to vendors during the selling phase of the ownership cycle. If an object is listed for sale before an average pre-determined use period, the tracking logic may send the metadata of the object to the vendors in the supply chain to inform the vendors of the less than expected use of the object. The vendors in the supply chain can try to determine the reason for resale within the short period of time by sending out questionnaires for the user identified from the object information or can try to offer additional offers to try to dissuade the user from selling or may offer to buy-back the object with offer to sell a comparable object in order to maintain customer loyalty towards the object and the vendor. The tracking logic benefits the users by easing shopping experience and the vendors in the supply chain in the maintaining inventory and a loyal customer base.

The tracking logic may also review the object information and suggest retaining the object in the user's inventory list based on analysis of the object information. For instance, if a user bought a collectible item or a car that might be of limited edition or is an antique or relic or is close to being an antique or relic, the tracking logic may recommend the user to retain the object in the user's inventory list.

Figure 5:
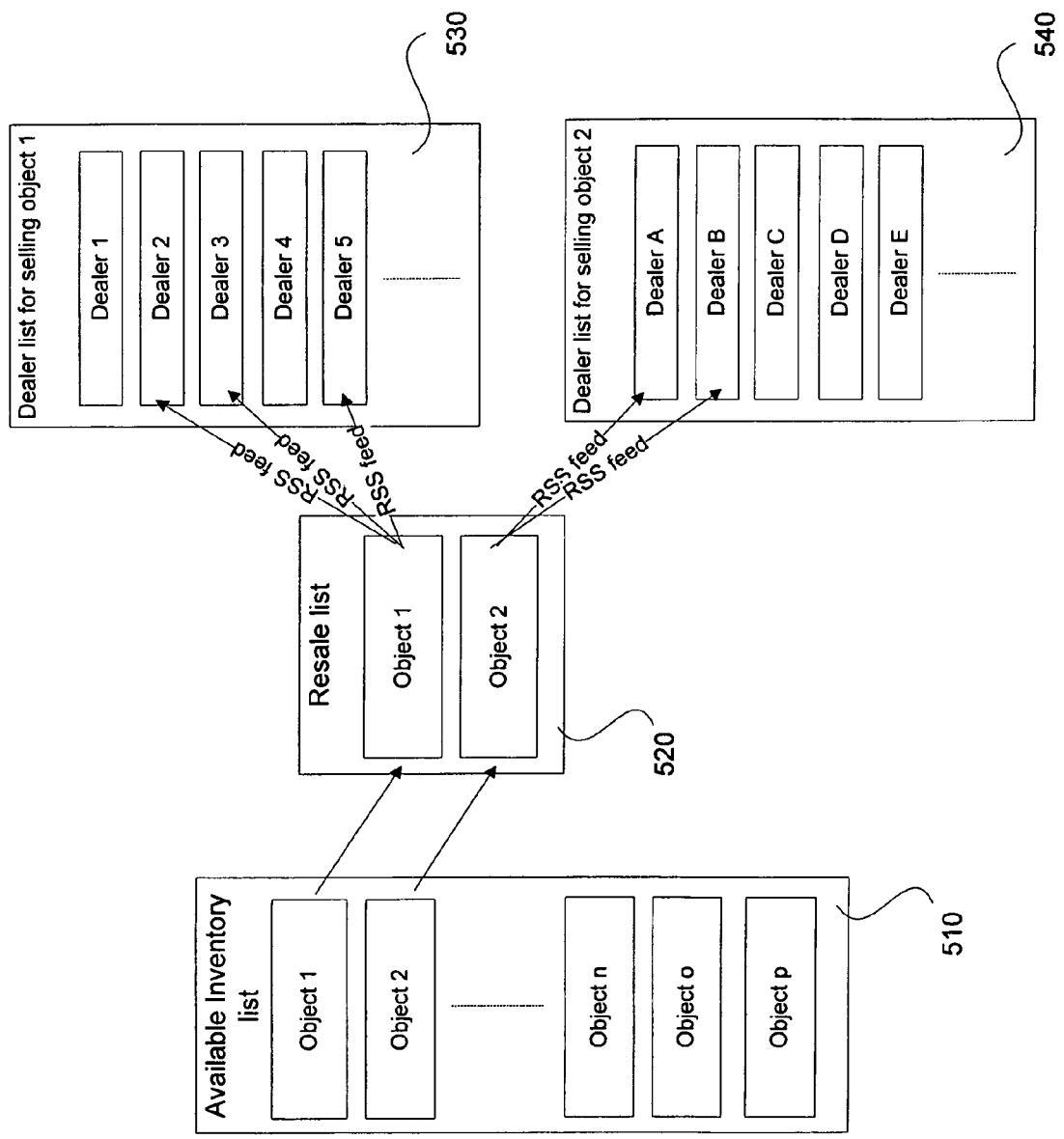
FIG. 5 illustrates a simplified block diagram of a resale process, in one embodiment of the invention.

Once the user is ready to sell the object and receives a list of vendors/dealers or sites to use for selling the object, the object is placed in a personal available inventory RSS feed. FIG. 5 illustrates a simplified block diagram of the process followed in selling one or more objects. As illustrated, the object that the user wishes to sell is identified from the available inventory list 510 of a user. The available inventory list 510 includes a list of objects that the user owns (for which there are no transaction records) and a list of objects that the user bought (for which transaction records are kept). The user expresses interest to sell one or more objects from the available inventory list 510. Upon receiving a request from the user to sell the one or more objects, the tracking logic identifies the one or more objects in the available inventory list 510 and moves the identified objects from the available inventory list 510 into a resale list 520 for the user. It should be noted that the tracking logic maintains a distinct available inventory list and a distinct resale list for each user. The tracking logic uses the transaction and W4 aspect related information to identify a list of vendors/retailers or sites that deal with each of the object in the resale list 520. The list of dealers/retailers or sites that deal with each object are presented in distinct dealer/retailer lists. As shown in FIG. 5, a list of dealers/retailers 530, 540 are identified for each object in the resale list 520. The identified list of dealers 530, 540 are then forwarded by the tracking logic to the mobile device for rendering on the display device associated with the mobile device. The user may be able to view the dealer lists 530, 540 and select one or more dealers/retailers/sites to use for selling each of the objects in the resale list 520. Accordingly, as shown in FIG. 5, the user has selected dealer 2, dealer 3 and dealer 5 in dealer list 530 to use for selling object 1 on the resale list 520 and has selected dealer A and dealer B in the dealer list 540 for selling object 2.

Once the dealers/sites are identified, the tracking logic creates a personal available inventory RSS feed which is fed to the identified dealers/sites. The dealer, in turn, updates the dealer's available inventory with the information from the RSS feed. The dealer maintains the available inventory, demand, sales, etc., at his/her own site. The available inventory of the dealer is made available to other users, such as $3^{rd}$ party sources, so that query for the object can be enabled. It should be noted that the available inventory at each dealer may also be used by the tracking logic to determine if an object not available at a store is available at a different store or dealer.

Meta Loyalty Process:

In addition to discounts and offers that affect the price of an object, the algorithm also provides the capability of tracking loyalty programs, repair programs and warranty programs associated with the ownership of the object and provides recommendations to the users during the purchase phase of the ownership cycle. Enrollment in such programs helps the vendors to maintain a loyal customer base and the users in maintaining the loyalty towards the products. The loyalty programs provide additional benefits and perks for the users to enhance the utility of the object.

The tracking logic provides the benefits of recommending suitable loyalty programs and enrolling the users into such programs at any time in the ownership cycle. Some of the loyalty programs may provide additional discounts for the object or benefits to the user if enrolled. The tracking logic may automatically track such loyalty programs and provide recommendations to the user so that the user can take advantage of such offers and benefits. The wish list of the user includes objects that the user would like to purchase and objects that interest the user. The objects that are of interest to the user may or may not be purchased or may be purchased if some of the criteria, set by the user, are met. Some of the criteria may be price, feature, style, color, size, or any other feature the object currently does not have. The tracking logic filters the objects in the wish list based on the intent of the user in purchasing the items. After filtering, the tracking logic tracks various vendors in the supply chain that provide loyalty programs associated with the object that the user is interested in buying. The embodiments are not limited to the loyalty programs, but are extended to include other programs that benefit the user, such as repair programs and warranty programs. The tracking logic automatically enrolls the user into a meta-loyalty program so that the user can take advantage of any loyalty programs available to the user. The enrollment into the meta-loyalty program entails setting up some parameters within the user profile for the user. Specifically, the user profile may include options to opt-in to the loyalty programs that the user may be interested in, including options for manual or automatic opt-ins. Further, the opt-ins may be brand-based, object-based, preference-based or vendor-based.

The tracking logic then performs cost-benefit analysis of the available loyalty programs, repair programs and warranty programs based on the user's profile and past purchase pattern of the user, aggregates the information from the various programs into a list based on the analysis and returns the list that the user is likely to show interest in and likely to benefit, to the user's mobile device. The tracking logic may also aggregate the number of users that have expressed interest in an object on an on-going basis and may report the information to the vendors in the supply chain. The vendors may analyze the aggregate data so that they may be able to formulate, in real-time, a loyalty program based on the number of users identified by the aggregate list and extend it to the users. If a loyalty program provides additional discounts for the object without any fee, the tracking logic may automatically enroll the user into such loyalty programs based on the user profile so that the user can take advantage of additional discounts or benefits offered by the loyalty program. As the user information is readily available within the user profile, it is possible to automatically enroll the user in such programs without any user input.

The tracking logic may take advantage of the W4 concept available at the mobile device for enrolling into loyalty programs. For instance, if a user is about to enter a store/business or is in a store/business and is in the process of buying one or more objects, the tracking logic quickly retrieves any loyalty programs that may be available for the selected objects and/or at the store and automatically enrolls the user into the one or more programs based on the meta loyalty options in the user profile. The tracking logic first retrieves the user's profile to determine if the user is already enrolled in or is a member of the loyalty program that is being offered at the store or business. If the user is not enrolled or is not a member of the loyalty program, then the tracking logic performs a cost-benefit analysis based on the user's profile and loyalty program information and provides recommendations based on the analysis so that the user may decide to enroll or not enroll in the loyalty program. The enrollment into the loyalty programs may be directly made with a manufacturer, retailer, or any other vendor in the supply chain that provides the loyalty programs based on the options and recommendations provided by the tracking logic and based on the user profile.

The tracking logic may define a threshold value and when the user's interest in the object or business exceeds the threshold value the logic may either automatically enroll the user in the loyalty program or make recommendations for enrolling into the loyalty program. For instance, if the user enters a Starbucks™ store once a week or once a month, then the user may be coming to meet an acquaintance and the logic may not trigger a recommendation for enrolling in the loyalty program. However, if the user enters a Starbucks™ store every day or two or three times a day, then it is obvious that the user is interested in one or more products offered at the Starbucks™ store and the logic may query to determine if the user is a member of the Starbucks™ customer loyalty program. If the user is not a member of the customer loyalty program at the store the logic automatically enrolls the user into the customer loyalty program offered by the Starbucks™ so that the user can benefit from any offers. The tracking logic may use transaction logs, W4 attributes of the mobile device, RFID chip encoded cups in order to determine the frequency of visits and type of object the user is interested prior to enrolling or recommending to enroll in the loyalty program. The logic binds the behavioral pattern of the user to the product to determine the user's level of interest in an object so as to make appropriate recommendations for enrolling into the various programs for an object.

In addition to enrolling in the loyalty program, the tracking logic may be configured to receive one or more user preferences related to the loyalty program and update the user loyalty program profile within the corresponding user profile. For instance, if a user enters a Starwood™ resort hotels and intends to spend a night, then the mobile device associated with the user and enabled with W4 options may recognize and may automatically enroll the user into any loyalty program offered at the Starwood resort hotel. In addition, any user preferences, such as type of room requested, wake up times, etc., can be automatically added to the user's loyalty program profile for future reference. When the user registers at the front desk of the hotel, the user's profile including the loyalty program profile are encoded in a code or barcode or in any other form and rendered at the display device of the mobile device of the user. The user has to just present the code at the front desk and all information associated with the user specific to the hotel registration is made available so that the front desk can provide access to the loyalty program and its subsequent benefits. In one instance, if the user always buys warranty on all purchases, then the user profile for the user may indicate such information and the user may be automatically enrolled into the warranty program available for the object.

In addition to discounts and loyalty programs, the tracking logic may enroll a user into one or more warranty programs based on the user profile. For instance, if a user has a tendency to always purchase a warranty on any object, the tracking logic will automatically enroll the user in the warranty program. If more than one type of warranty is offered, the tracking logic may request and receive confirmation on a specific type of warranty that a user wishes to enroll, at which time the tracking logic automatically enrolls the user under that warranty program.

Figure 6A:
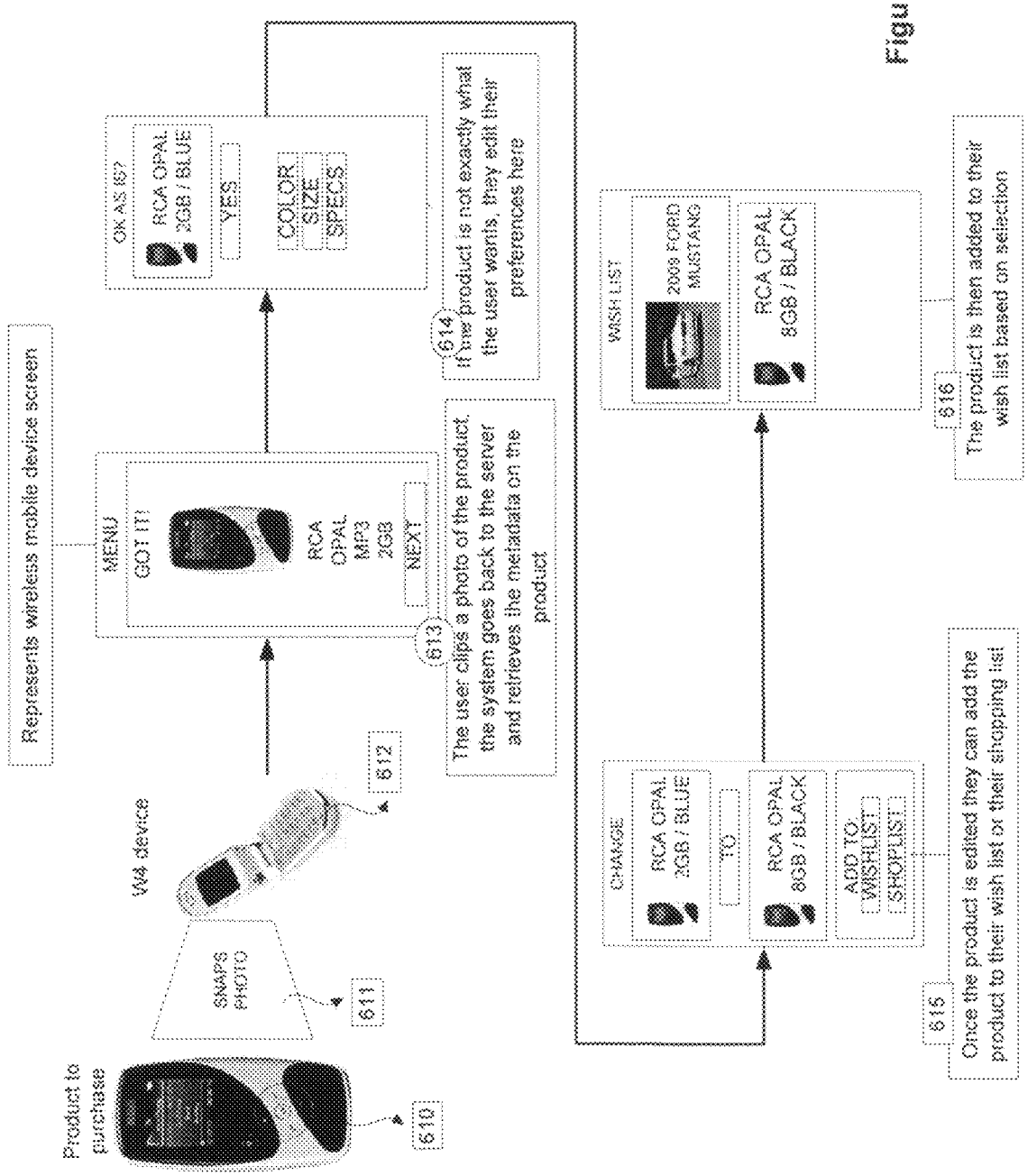
FIG. 6A illustrates a sample process flow diagram engaged in generating a wish list for a user, in accordance with one embodiment.
Figure 6B:
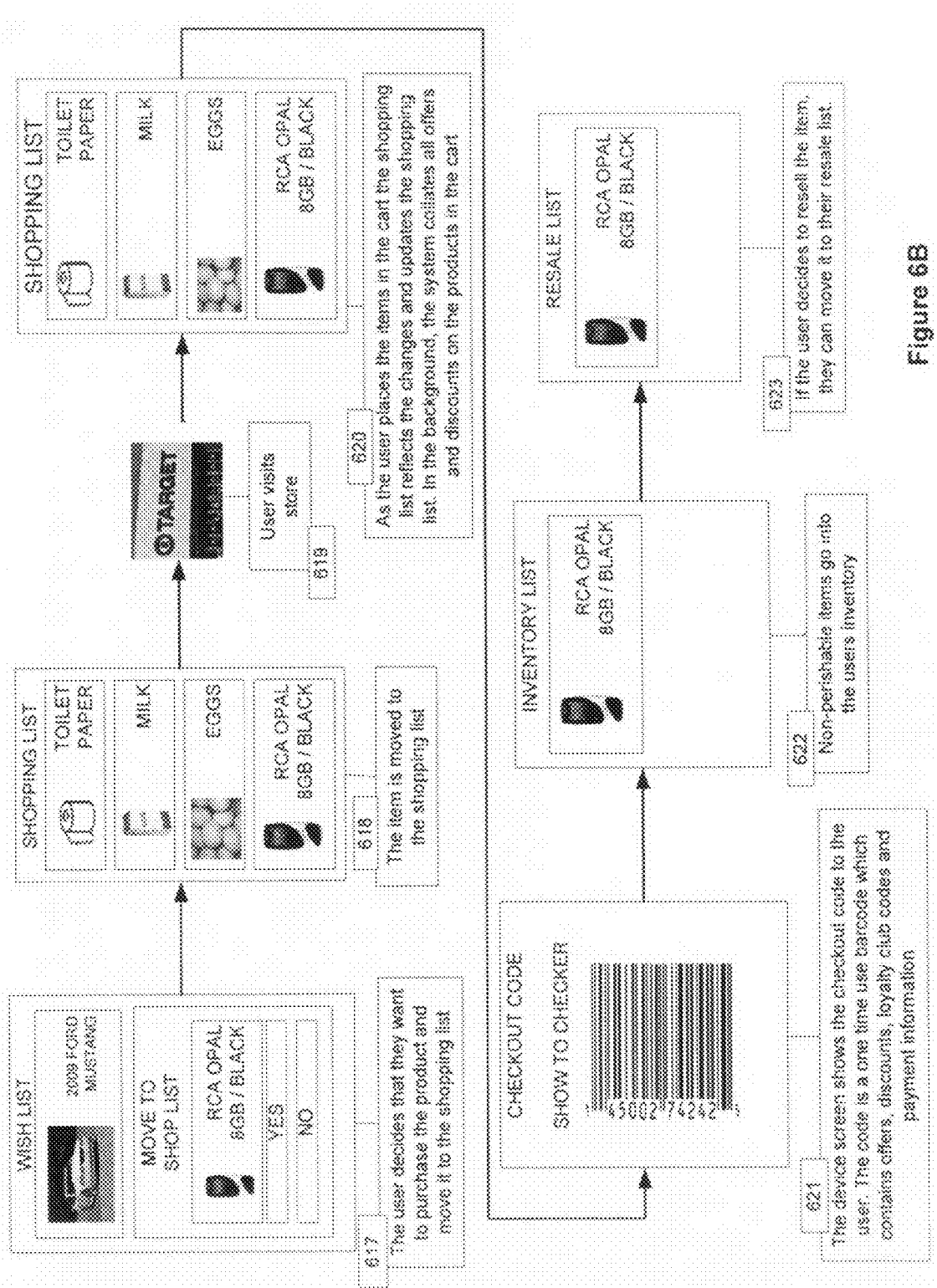
FIG. 6B illustrates a sample process flow diagram of an object progressing through various stages of ownership cycle, in one embodiment of the invention.
Figure 7:
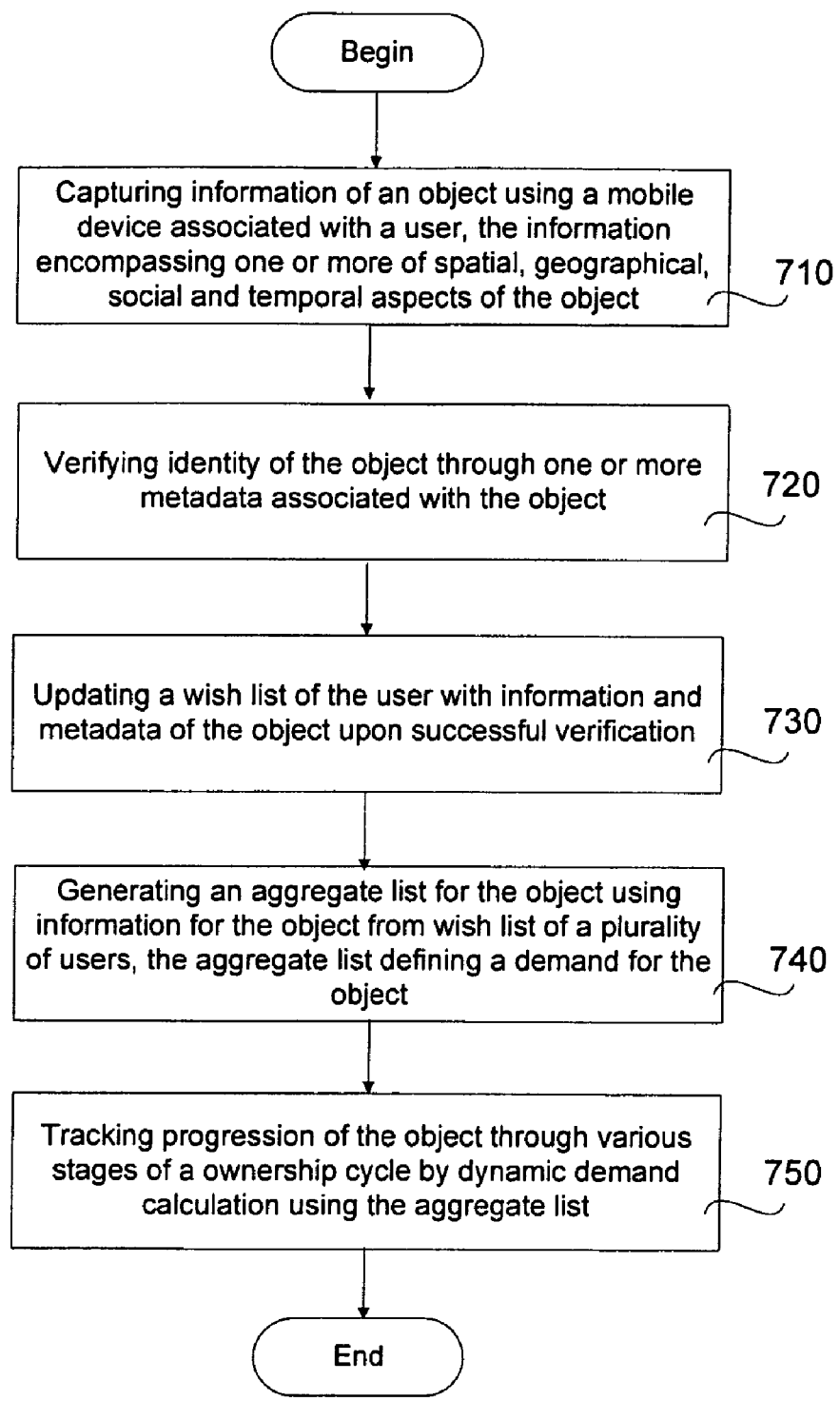
FIG. 7 illustrates a flowchart of process operations involved in managing demand of an object, in one embodiment of the invention.

With the above detailed description of the three major aspects of the demand management algorithm, a method for managing a demand of an object will now be described with reference to FIG. 7 in conjunction with FIGS. 6A and 6B. FIGS. 6A and 6B illustrate an overview of the transactional flow for the object in an ownership cycle and FIG. 7 illustrates process operations involved in managing the demand of an object, in one embodiment of the invention. The process begins at operation 710 wherein information of an object is captured using a mobile device. The information of the object is captured through a mobile device of a user who is interested in an object, such as a mobile phone, as illustrated in step 610 of FIG. 6A. In the embodiment illustrated in FIG. 6A, the user captures an image 611 of the object illustrated in 610 using a W4 enabled mobile device 612. The mobile device may be a mobile phone or a personal digital assistant device or any other device equipped with an image capturing tool, such as a camera and configured to capture the W4 attributes, such as who, what, where and when, of the object along with other information pertaining to the identity of the object. As a result, the captured information encompasses one or more of spatial, topical, social and temporal attributes of the object along with other information pertaining to the object. It should be noted that the captured information may or may not be the exact product the user is interested. When the captured information is not of the actual object but close enough to the actual object of interest, the user can provide user preferences to provide the variations to the captured information to arrive at the actual object of interest.

The information of the object is then verified and the identity validated using metadata associated with the object, as illustrated in operation 720. The captured information of the object is first analyzed at the user's mobile device to determine the object's identity and then transmitted to a server. A demand management algorithm on the server receives the information, parses the information and queries a plurality of product databases belonging to a plurality of vendors to obtain metadata associated with the object, as illustrated in step 613. The metadata of the various products may be stored along with product information in the product databases at each of the vendors or may be stored in separate databases. In any case, the algorithm queries the metadata database to obtain metadata information for the object. The algorithm also queries a user profile database to obtain the user profile. The information of the object is then compared against the metadata and the user profile to validate the identity of the object. The validated information is forwarded to the mobile device for user confirmation, as illustrated in step 614. The user is then given the option to edit one or more parameters of the product in order to record user preferences. If the user wants the product as-is, the user can select "Yes" option on the display device. If the user wants to make modifications to the object, then the user may select a different set of parameters for the object. As illustrated, the most popular modifiable parameters for the object, defining additional user preferences, are rendered, with additional in-depth spec changes available under a sub-menu. The additional user preferences define useful variance of the object. Upon successful validation or upon receipt of additional user preferences, the object is updated to a wish list of the user, as illustrated in operation 730. The additional user preferences are confirmed and the object is tagged for immediate purchase (shopping list) or deferred purchase (wish list), as illustrated in step 615.

Once the confirmation to defer the purchase is received by the algorithm, the wish list associated with the user is promptly updated, as illustrated in step 616. An aggregate list is generated for each object on the wish list of the user by consolidating the information pertaining to the object from a plurality of users, as illustrated in operation 740. The aggregate list may be generated on demand or periodically and represents a demand for the object. The aggregate list may be reported to one or more vendors in the supply chain so the vendor can appropriately plan for the object's inventory, offers, promotions, etc. The process concludes with the tracking of the progression of the object through various phases of the ownership cycle, as illustrated in operation 750.

FIG. 6B illustrates the process flow of the object through the various phases of the ownership cycle. Once the object is on the wish list of a user, the progression of the object is tracked through the various phases of the ownership cycle. Some time after the object is placed on the wish list, the user may decide to purchase the object. The decision to purchase the object may be made by the user based on recommendations from a demand management algorithm, as illustrated in step 617. The algorithm may have obtained information that the object on the user's wish list is on sale or that it is the optimal time to purchase the object based on the analysis performed by the algorithm. Once the user has selected the object for purchasing, the identified object is moved into the shopping list, as illustrated in step 618. The user may decide to visit a store recommended by the algorithm as the best place to purchase the object, as illustrated in step 619. As the user proceeds to place the object in the shopping cart, the object is scanned, proximity sensored via RFID tag or similar tag or clipped by the capturing device in the mobile device and the algorithm senses the change and updates the shopping list, as illustrated in step 620.

As the user proceeds to the checkout, the user or the algorithm tabulates all the objects in the shopping cart. The algorithm further collates all offers and discounts available for the object in the shopping cart in the background. The algorithm further aggregates all the discounts, offers, loyalty club information into an aggregate list and places the aggregate list into a "coupon playlist." A super barcode is generated encompassing all the information related to the object including the tabulated information of all the objects in the shopping cart, the coupon playlist associated with the object and the user, and payment information for the user, as illustrated in step 621. Upon completion of payment, the object is moved from the shopping list to the user's inventory list, as illustrated in step 622. It should be noted that the algorithm has enough intelligence to identify the non-perishable objects in the shopping cart and to move only those objects into the user's inventory list. The user's inventory list includes objects that are purchased and objects that are owned by the user. While the object is in the inventory list, the user may continue to receive aggregate list of additional offers and loyalty program information based on the user profile and the demand for the object.

At some point during the ownership of the object, the user may decide to sell the object. When the algorithm receives the request to sell the object, the object is moved from the inventory list to the resale list, as illustrated in step 623. As the object is being moved from the inventory list to the resale list, the algorithm identifies the vendors and websites in the supply chain that deal with the object, analyzes the vendors reputation and performance metrics and provides a recommended list of vendors/sites to use for selling the object. The user may use all the vendors in the recommended list or may select one or more from the recommended list to sell the object. The algorithm also performs a trend analysis to determine the demand for the object in the marketplace and provide recommendations to the user on the pricing strategy and the best time to sell the object in order to obtain maximum return on the investment. The use may sell the object based on the recommendations from the algorithm or may sell based on his/her own analysis. Upon sale of the object, the object enters the ownership cycle of a new user and the cycle of ownership continues.

As can be seen, the various embodiments of the invention provide streamlined information, perform dynamic demand analysis for the object using the streamlined information at each and every phase of the ownership cycle and provide a set of information/recommendations to both the users and the vendors so that they can make useful and strategic decisions in relation to the object. The vendors can formulate offers and incentive programs so as to develop and maintain a strong and loyal customer base for the object.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing demand of an object, comprising:
    receiving captured information about the object through a mobile device associated with a user, wherein the mobile device is configured to capture information associated with one or more of temporal, spatial, topical or social attributes of the object;
    verifying identity of the object through one or more metadata associated with the object;
    updating a wish list of the user with information and metadata associated with the object upon successful verification of the identity of the object;
    generating one or more aggregate lists for the object using information and metadata associated with the identified object from a plurality of users, the aggregate lists defining demand for the object;
    tracking progression of the object through an ownership cycle by dynamic demand calculation based on the one or more aggregate lists for the object, wherein the ownership cycle of the object includes a plurality of phases with each phase generating a corresponding distinct list for the object,
    receiving purchase intent for the object through the mobile device of the user;
    querying a product database for the object to determine any incentives available for the object based on the purchase intent and information associated with the object; and
    forwarding the available incentives associated with the object to the mobile device for display.

2. The method of claim 1, wherein capturing information includes any one or more of capturing an image, barcode, RFID or one or more sensed parameters of the object on the mobile device associated with the user.

3. The method of claim 1, wherein verifying identity of the object further includes, analyzing the captured information to determine identification of the object;
    accessing a metadata database associated with the object to collect metadata defining one or more characteristics pertaining to the object;
    rendering the metadata associated with the object on a display device of the mobile device; and
    receiving validation of the identity of the object through the mobile device.

4. The method of claim 3, wherein receiving validation further includes receiving one or more additional user preferences to further define the object, the user preferences reflecting variations for the object that is used to determine demand for the variations of the object, the additional user preferences is based upon unsuccessful validation of the object.

5. The method of claim 4, wherein updating a wish list further includes updating the additional user preferences to the wish list of the user along with the information and the metadata associated with the object.

6. The method of claim 1, wherein generating aggregate lists further includes, consolidating the information and metadata associated with the object from a plurality of users.

7. The method of claim 6, wherein the consolidation of the information and metadata is performed at one of a pre-determined time or on demand basis.

8. The method of claim 1, wherein the distinct list for the object includes one or more of the wish-list, a shopping list, an inventory list and a resale list, wherein the wish-list includes objects with purchase intent sometime in the future, the shopping list includes objects with immediate purchase intent, the inventory list includes objects after purchase and during use and the resale list includes objects owned by the user that are no longer required and looking to resell to another user.

9. The method of claim 1, wherein tracking the progress of the object further includes,
    automatically decrementing the aggregate list for the object when the purchase intent is to purchase the object; and
    transferring the object from the user's wish list to the user's shopping list based on the purchase intent.

10. The method of claim 1, further including, performing a trend analysis of the object in the wish list using information of the object;
    generating one or more recommendations based on the trend analysis, the recommendations defining a best time to purchase the object;
    presenting the recommendations at the mobile device; and
    receiving user interaction at the mobile device, the user interaction determining the selection of one of the recommendation indicating an immediate purchase intent of the object stored in the wish list.

11. The method of claim 9, further includes dynamically updating the shopping list of the user with available incentives for the object based upon the purchase intent for the object.

12. The method of claim 9, further includes, automatically evaluating one or more programs providing the incentives for the object by performing cost benefit analysis based on a purchase history of the user, wherein each of the programs providing incentives is a fee-based program charging a fee for enrollment;
    providing recommendations for enrolling in each of the programs based on the evaluation; and
    enrolling in a program providing incentives based on the evaluation and recommendation, the enrollment enabling automatic application of the incentive associated with the program to the object, wherein enrollment into the incentive program is free of any enrollment charges.

13. The method of claim 1, further includes,
    determining the incentive program associated with a retailer dealing with the object of interest to the user based on topical information and other user profile information associated with the user;

accessing a user profile database to determine if the user is currently enrolled in the incentive program provided by the retailer; and automatically enrolling the user to the incentive program of the retailer upon verification that the user is not currently enrolled in the incentive program, the enrollment into the incentive program enables obtaining information on one or more ancillary products that enhance use of the object.

14. The method of claim 11, wherein dynamically updating the shopping list further includes, physically adding the object to a shopping cart, the addition of the object identifying purchase of the object;

scanning the object in the shopping cart using the mobile device;

generating a super barcode for the scanned object in the shopping cart, the super barcode encoding one or more of information associated with the object, one or more incentives available for the object, information associated with program enrollment and payment information;

rendering the super barcode on the display device of the mobile device; and storing the super barcode in the shopping list of the user.

15. The method of claim 11, further includes dynamically defining a purchase price for the object based on the information contained in the corresponding aggregate lists and one or more of social, topical, temporal and spatial attributes associated with the object, the purchase price reflecting a pricing strategy applied based on the aggregate information reflecting the demand for the object.

16. The method of claim 15, further includes applying the available incentives to the purchase price of the object during checkout of the object.

17. The method of claim 15, further includes moving the object from the shopping list of the user to the inventory list of the user upon payment of purchase price of the object.

18. The method of claim 1, wherein the object is a non-perishable object.

19. The method of claim 10, wherein tracking the progress of the object further includes receiving a request for selling the object based on one of user interaction or trend analysis.

20. The method of claim 1, further includes extracting the metadata and information for the object including duration of ownership and description of the product so as to provide ownership analysis.

21. The method of claim 19, wherein the trend analysis further includes, analyzing information to determine demand for the object based on ownership of the object; and suggesting a best time for selling the object based on the analysis.

22. The method of claim 19, further includes, determining a list of dealers that deal with the object;

identifying one or more dealers from the list of dealers to use for selling the object;

automatically enlisting the object for sale at the identified dealers, wherein the dealer updates inventory associated with the dealer with the information and metadata associated with the object upon enlisting of the object; and transferring the object from the inventory list to the re-sale list upon receiving the request to sell the object.

23. The method of claim 19, further includes, determining a list of users interested in purchasing the object;

identifying one or more users from the list of users for selling the object;

automatically informing the identified users on the availability of the object for sale, wherein a wish list of the identified users is updated with the information and metadata associated with the object; and transferring the object from an owner's inventory list to the owner's re-sale list upon receiving the request to sell the object, wherein the owner is the user currently owning the object and has expressed interest in selling the object.

24. A system for managing a demand of an object, comprising:

a mobile device configured to capture information about the object, the information encompassing one or more of temporal, spatial, topical and social attributes of the object, the mobile device equipped with, an image capturing tool to capture information of the object, a text capturing tool to capture information about the object, a rendering device to render information associated with the object and to review the information captured by the capturing tool;

a sensing tool to scan one or more objects during a progression of the object through different phases of ownership cycle;

a server equipped with, a demand management algorithm to manage an ownership cycle of the object, the demand management algorithm configured to interact with the mobile device to receive the information for the object, the demand management algorithm includes, a verification logic configured to obtain metadata associated with the object and to verify and validate identity of the object;

an aggregation logic configured to generate one or more aggregate lists for the object by consolidating a request for the object from a plurality of users, the one or more aggregate lists defining a demand for the object; and a tracking logic with a dynamic demand calculator to track progression of the object through an ownership cycle of the object based on the one or more aggregate lists, the ownership cycle including a plurality of phases, each of the plurality of phases creating a distinct list for the object associated with a user, wherein the server further includes a server interface to interact with one or more database to obtain incentive information and recommendation information associated with the object, the data is accessible to the server and is located anywhere within or outside the server, wherein the object is a non-perishable object.

25. The system of claim 24, wherein the mobile device further includes distinct databases within a memory to store a plurality of information associated with the object and information associated with a user of the mobile device, the mobile device further configured to store distinct lists associated with the plurality of phases of ownership.

26. The system of claim 24, wherein the tracking logic is further configured to, generate a super barcode for the scanned object, the super barcode being encoded with at least information associated with the object, and one or more of incentives and recommendations available for the object, information associated with any program enrollment, profile of a user and payment information; and move the object from a first distinct list to a second distinct list as the object progresses from a first phase to a second phase of the ownership cycle, the tracking logic decrementing the object from the first distinct list and incrementing the object in the second distinct list, wherein the first and second distinct lists correspond to the first and second phase of ownership associated with the object.

* * * * *